Aug. 22, 1967   W. A. VON WALD, JR., ETAL   3,336,802
DEVICE FOR AVERAGING WIND VELOCITY AND DIRECTION
Filed Sept. 30, 1964
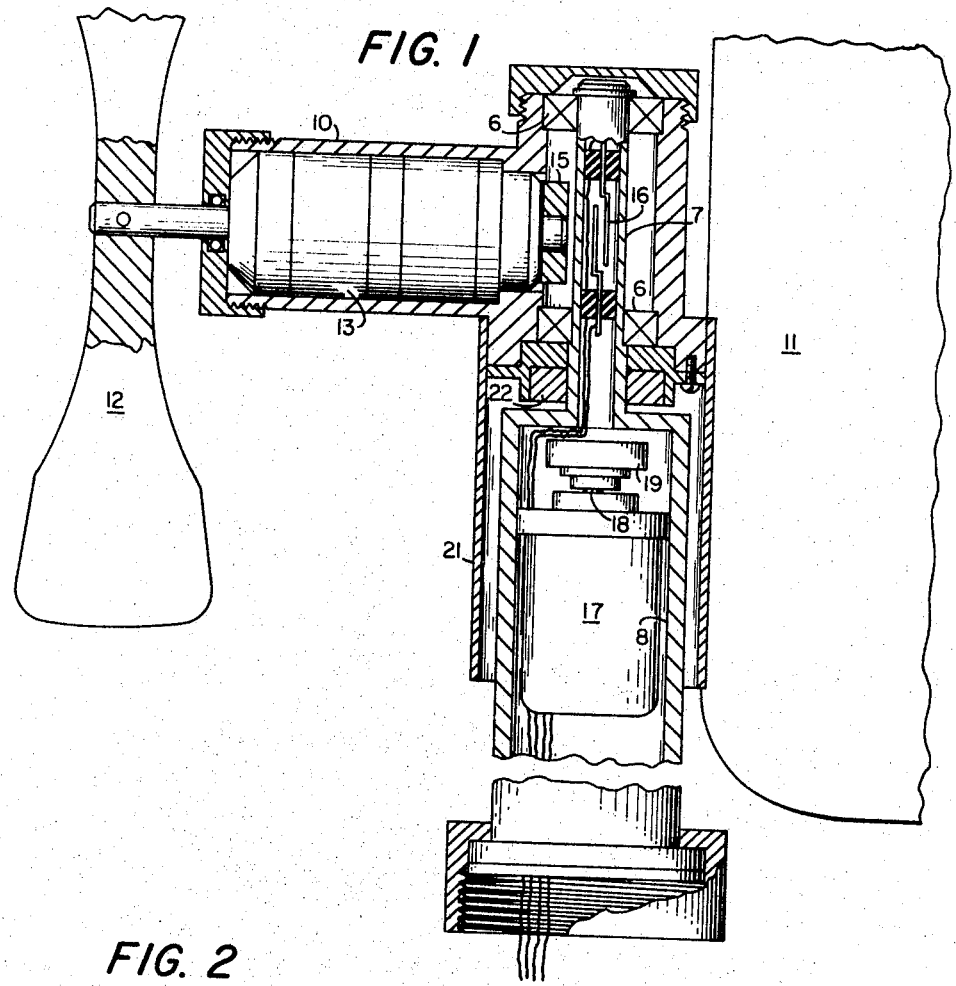
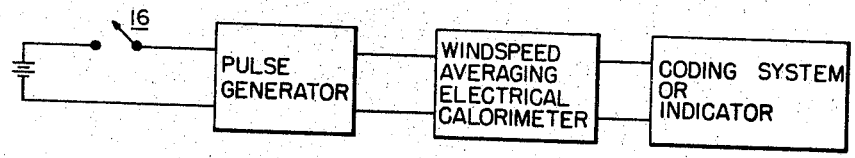
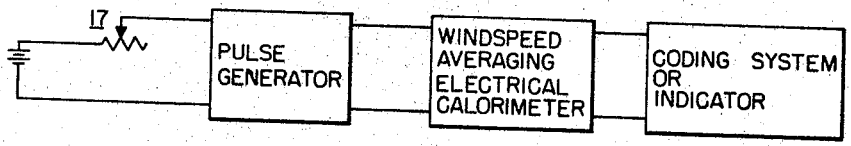
INVENTOR
WALTER A. VON WALD JR.
SAMUEL J. RILEY
ROBERT A. LINDSAY

United States Patent Office 3,336,802
Patented Aug. 22, 1967

3,336,802
DEVICE FOR AVERAGING WIND VELOCITY AND DIRECTION
Walter A. Von Wald, Jr., Hillcrest Heights, Md., Robert A. Lindsay, Charleston, W. Va., and Samuel J. Riley, Upper Marlboro, Md., assignors to the United States of America as represented by the Secretary of the Navy
Filed Sept. 30, 1964, Ser. No. 400,616
1 Claim. (Cl. 73—189)

ABSTRACT OF THE DISCLOSURE

A device for averaging wind velocity and wind direction for use on a weather station such as a buoy or on shore. A magnetic switch is operated by a magnet secured to a propeller rotated shaft in which the magnetic switch controls an electrical circuit that sends a signal to a telemetering system which sends out a signal. A magnet mounted on the fuselage controls a magnet on a potentiometer to indicate wind direction which is also telemetered by a telemetering system.

The invention described herein may be manufactured and used by or for the Government of the United States of America for governmental purposes without the payment of any royalties thereon or therefor.

The present invention relates to apparatus for measuring weather conditions and more particularly relates to a device for measuring average wind velocity and direction of the wind.

The measurement of wind velocity and direction of the wind at various locations on the earth's surface provides important data which is used in predicting weather. The present invention may be used for manned as well as unmanned stations for determining wind velocity and direction.

This device can be used in all types of weather, in polar regions as well as in tropical regions. As a multi-signal system for relaying weather conditions such as temperature, humidity, cloud cover, etc., and when mounted on a buoy, wave velocity as well as wave height may be determined by the combined system. The measurement of wind velocity at different locations of air surface provide useful data which is used in predicting weather conditions.

Various types of instrumentation have been used for determining weather conditions such as wind velocity and direction, however, these units have their restrictions as to use for all weather conditions. Recently, it has been determined that wind speeds travel in periodic waves. Thus, the data reported by an instantaneous reading anemometer at the crest of one of these waves would differ greatly from the average wind speed.

It is, therefore, an object of the present invention to provide an all weather wind velocity and wind direction determining device.

Another object is to provide a simplified device for determining average wind direction and velocity for data recording and telemetering systems.

The nature of this invention as well as other objects and advantages thereof will be readily apparent from consideration of the following specification relating to the annexed drawing, in which:

FIG. 1 is a cross sectional view which illustrates the parts thereof;

FIG. 2 illustrates an electrical circuit for generating averaging and coding or indicating the average wind speed; and FIG. 3 illustrates an electrical circuit for indicating wind direction.

The anemometer of the present invention includes a magnetic switch which is closed periodically by a magnet that is driven by an impeller through a sixty (60) to one (1) reduction gear. The pitch of the impeller is such that the impeller rotates at 3600 revolutions per minute at 100 knots wind speed. Therefore, the magnetic switch closes 60 times per minute at 100 knots. To integrate this anemometer into a weather station, the magnetic switch is used to trigger a pulse generator. The output of the pulse generator is connected to an electrical calorimeter such as described in patent application Ser. No. 300,948, filed Aug. 8, 1963. Current pulses through the calorimeter cause a resistance change which is independent of the rate of switching the magnetic switch. By measuring the change in resistance, the average wind speed is obtained.

The relative wind direction is measured by the resistance selected on a 360° potentiometer. A magnet is permanently mounted in the movable anemometer body and rotatable therewith, rotating a magnet that is mounted onto the wiper of the potentiometer inside the anemometer shaft that is secured in a fixed position to the weather station. From the position of the anemometer with respect to the weather station, the direction of the wind can be determined. Electromagnetic damping between the follower magnet on the potentiometer and the magnet on the rotating body aid in preventing measurements of different directions of quick gusts of wind from different directions.

The anemometer is rotatable on bearings 6 located at the top and near the bottom of a cylindrical support 7 that is integral with a sleeve 8 which is in turn secured to a housing of the weather station within which the current supply and telemetering equipment is housed. The anemometer includes a fuselage 10 having a tail section 11 at one end and a propeller 12 at the other end. The propeller drives a 60 to 1 reduction gear arrangement 13 which is secured within the fuselage at right angles to the cylindrical support 7 such that the propeller will rotate at a greater rotational velocity than a magnet which is driven by the driver driven at a rotation velocity of 1/60 of the rotational velocity of the propeller.

A normally open magnetic switch 16 is positioned within support member 7 in axial alignment therewith adjacent to the magnet 15 and is closed with each revolution of the shaft as the magnet rotates by relative to the switch contacts. The magnetic switch completes an electrical circuit to a pulse generator triggered by an electrical pulse due to closing of the switch. The generated pulse is directed to an electrical calorimeter (such as described in patent application Ser. No. 300,948, filed Aug. 8, 1963) which averages the wind speed over a desired period of time. Averaging can be from a few seconds to more than one hour depending upon the characteristics of the electrical calorimeter. The average speed signal is then directed to a signal coding instrument or indicator depending on the operation desired. The signal may be telemetered if desired wherein the average wind speed is determined by the number of revolutions of the propeller and consequently the number of openings and closings of the magnetic switch that controls the pulse generator.

The direction from which the wind is blowing is determined by a fixed relative wind direction 360° potentiometer 17 positioned within sleeve 8 below support 7 and connected electrically within an electrical circuit in which the wind direction is determined by the amount of current flow through the circuit and telemetered for reception by a desired receiver. The amount of current flow depends on the position of the wiper contact of the potentiometer. A shaft 18 extending from the relative wind direction potentiometer along the axis of the sleeve 8 has a magnet 19 secured thereto and rotatable therewith in a plane perpendicular to the axis of the sleeve.

A magnet 22 is permanently mounted in the movable anemometer housing and rotatable therewith about the support member 7. Magnet 22 is mounted adjacent to the magnet 19 on the 360° potentiometer and has a magnetic attraction on the magnet 19. The magnet 22 rotates with the fuselage and attracts the magnet 19 on the potentiometer shaft thereby rotating the potentiometer control as the fuselage rotates due to the wind. The fuselage aligns iself with the wind, thus, the potentiometer wiper contact is positioned by the attraction between the magnet 22 and the magnet 19 on the potentiometer shaft. The value of the current flow is amplified, averaged, recorded or coded and telemetered to a receiver as desired.

The cylindrical support member upon which the anemometer rotates is secured to the top plate of a buoy housing or the housing of any type weather station. The electrical wire connections from the magnetic switch 16 and the relative wind direction potentiometer 17 are connected with the power sources and telemetering equipment in the housing of the weather station through the connector at the bottom of the sleeve which is connected to the top plate. Since the anemometer is to be used in all types of weather and possibly located on a buoy in the water, steps are taken to prevent water from entering the fuselage and the housing. Thus, the propeller shaft, the sleeve, and support member 7 are provided with water tight seals. The skirt extension 21 extending downwardly from the fuselage about the sleeve 8 fits close to the sleeve and carries the tail which aligns the device with the wind direction.

In operation, the instrumentation, power supply, telemetering equipment, etc., are all connected operational in the weather station. The weather station is then positioned at the desired place and the instruments are activated for operation. The anemometer propeller rotates, opening and closing the magnetic switch which triggers a pulse generator, the pulses are averaged and the signals are recorded or coded for timed telemetering of the signals or for a permanent record which is picked up later, or for direct telemetering whichever is desired. The remainder of the instruments are made operational, along with the anemometer to carry out their desired operation.

Wind speed is proportional to pressure gradient and wind direction indicates the direction of the pressure gradient and hence the nearest low pressure area. Thus, the wind information indicates the weather condition many miles away from the instrument. Thus, from information transmitted or recorded by the device herein described one may predict expected weather.

Obviously many modifications and variations of the present invention are possible in the light of the above teachings. It is therefore to be understood that within the scope of the appended claim the invention may be practiced otherwise than as specifically described.

What is claimed is:

A system for determining wind speed and wind direction in an area subject to intense water conditions; which comprises:

a water tight housing upon which said system is mounted, an integral water tight cylindrical support and sleeve supported by said housing, in axial alignment therewith, a fuselage mounted for rotation in a horizontal plane about said cylindrical support, a first shaft, said first shaft extending from said fuselage normal to the axis of said cylindrical support, a propeller on said first shaft for driving said first shaft as any wind blows, a reduction gear assembly within said fuselage, said reduction gear driven by said propeller through rotation of said first shaft, a first magnet secured to said reduction gear assembly and driven thereby, an electrical circuit, a normally open magnetic switch mounted within said water tight cylindrical support adjacent said first magnet and electrically connected within said electrical circuit to control said circuit due to operation by said first magnet, a second magnet secured to said fuselage coaxial with said cylindrical support and said sleeve for rotation about said cylindrical support along with rotation of said fuselage, a relative wind direction 360 degree potentiometer secured within said sleeve along the axis thereof adjacent to said second magnet, a rotatable shaft extending from said potentiometer along the axis thereof to rotate a wiper contact therein, a third magnet, said third magnet secured to said shaft extending from said potentiometer and in alignment with said second magnet, said second and third magnets rotatable about the axis of said sleeve in parallel planes relative to each other, said third magnet adapted to follow any rotational movement of said second magnet as said fuselage rotates about said sleeve, a skirt extending downwardly from said fuselage alongside said sleeve and rotatable with said fuselage, a tail section secured to said skirt for aligning said fuselage with the direction of the wind, said magnetic switch and said 360 degree potentiometer controlling current flow to control separate electrical circuits to separate signal indicators which indicate the average wind velocity and the direction of the wind.

References Cited

UNITED STATES PATENTS

| 2,592,583 | 4/1952 | Lyon | 73—189 |
| 2,648,980 | 8/1953 | Wood et al. | 73—189 |
| 3,069,907 | 12/1962 | Eddy | 73—189 |
| 3,175,152 | 3/1965 | Shafer | 324—70 |
| 3,182,503 | 5/1965 | Corcoran | 73—189 X |

JAMES J. GILL, *Acting Primary Examiner.*

RICHARD C. QUEISSER, *Examiner.*

J. J. SMITH, *Assistant Examiner.*